(12) United States Patent
Kudo

(10) Patent No.: US 12,478,467 B2
(45) Date of Patent: Nov. 25, 2025

(54) INTRAOCULAR LENS INJECTOR

(71) Applicant: Hoya Corporation, Tokyo (JP)

(72) Inventor: Kazunori Kudo, Saku (JP)

(73) Assignee: Hoya Medical Singapore Pte. Ltd., Singapore (SG)

( * ) Notice: Subject to any disclaimer, the term of this patent is extended or adjusted under 35 U.S.C. 154(b) by 997 days.

(21) Appl. No.: 17/435,762

(22) PCT Filed: Dec. 23, 2019

(86) PCT No.: PCT/JP2019/050238
§ 371 (c)(1),
(2) Date: Sep. 2, 2021

(87) PCT Pub. No.: WO2020/183856
PCT Pub. Date: Sep. 17, 2020

(65) Prior Publication Data
US 2022/0151767 A1 May 19, 2022

(30) Foreign Application Priority Data
Mar. 13, 2019 (JP) ................. 2019-045673

(51) Int. Cl.
*A61F 2/16* (2006.01)
*A61F 9/007* (2006.01)

(52) U.S. Cl.
CPC ............ *A61F 2/167* (2013.01); *A61F 2/1678* (2013.01); *A61F 9/00736* (2013.01); *A61F 2002/1681* (2013.01)

(58) Field of Classification Search
CPC .... A61F 2/167; A61F 2/1678; A61F 9/00736; A61F 2002/1681
See application file for complete search history.

(56) References Cited

U.S. PATENT DOCUMENTS 2,761,446 A 9/1956 Reed
3,212,685 A 10/1965 Swan
(Continued)

FOREIGN PATENT DOCUMENTS

CN 101073519 A 11/2007
CN 204601363 U 9/2015
(Continued)

OTHER PUBLICATIONS

Presentation given by James P. McCulley, titled "Benefits of Newest Generation Fully Preloaded Aspheric IOL Delivery System," on Sep. 16, 2008 at the "Aspheric IOLs" free paper session of the 2008 Congress of the European Society of Cataract and Refractive Surgery, in Berlin, Germany.
(Continued)

*Primary Examiner* — Tan-Uyen T Ho
*Assistant Examiner* — Chima U Igboko
(74) *Attorney, Agent, or Firm* — Henricks Slavin LLP

(57) ABSTRACT

There is provided an intraocular lens injector for improving accuracy of tacking, which is an intraocular lens injector 1 for injecting an intraocular lens 4 into an eye, the intraocular lens including an optical portion 41 having an optical function and support portions 42a and 42b extending from the optical portion 41, including: a protrusion 20 for bending a forward support portion 42a while abutting against the forward support portion 42a, the forward support portion being one of the support portions 42a and 42b and being disposed on the front side in an advancing direction of the intraocular lens, when making the intraocular lens 4 advance along an inner wall of a hollow body in which the intraocular lens 4 is set and thereby releasing the intraocular lens 4 from the hollow body in a state in which the intraocular lens 4 is folded with an inner surface of the optical portion 41 facing inward, wherein the protrusion 20 has a retainer that tem-
(Continued)

porarily suppresses progress of bending of the forward support portion 42*a* by retaining the forward support portion 42*a*, when the intraocular lens 4 is being folded.

16 Claims, 7 Drawing Sheets

(56) References Cited

U.S. PATENT DOCUMENTS

| | | |
|---|---|---|
| 4,205,747 A | 6/1980 | Gilliam et al. |
| 4,269,307 A | 5/1981 | LaHaye |
| 4,423,809 A | 1/1984 | Mazzocco |
| 4,573,998 A | 3/1986 | Mazzocco |
| 4,608,049 A | 8/1986 | Kelman |
| 4,634,423 A | 1/1987 | Bailey |
| 4,681,102 A | 7/1987 | Bartell |
| 4,697,697 A | 10/1987 | Graham et al. |
| 4,699,140 A | 10/1987 | Holmes |
| 4,702,244 A | 10/1987 | Mazzocco |
| 4,715,373 A | 12/1987 | Mazzocco et al. |
| 4,747,404 A | 5/1988 | Jampel et al. |
| 4,750,498 A | 6/1988 | Graham |
| 4,759,359 A | 7/1988 | Willis et al. |
| 4,763,650 A | 8/1988 | Hauser |
| 4,765,329 A | 8/1988 | Cumming et al. |
| 4,769,034 A | 9/1988 | Poley |
| 4,781,719 A | 11/1988 | Kelman |
| 4,787,904 A | 11/1988 | Severin |
| 4,810,249 A | 3/1989 | Haber et al. |
| 4,819,631 A | 4/1989 | Poley |
| 4,834,094 A | 5/1989 | Patton |
| 4,836,201 A | 6/1989 | Patton |
| 4,862,885 A | 9/1989 | Cumming |
| 4,880,000 A | 11/1989 | Holmes et al. |
| 4,919,130 A | 4/1990 | Stoy et al. |
| 4,934,363 A | 6/1990 | Smith et al. |
| 4,955,889 A | 9/1990 | Van Gent |
| 4,976,716 A | 12/1990 | Cumming |
| 4,988,352 A | 1/1991 | Poley |
| 4,994,028 A | 2/1991 | Leonard et al. |
| 5,066,297 A | 11/1991 | Cumming |
| 5,098,439 A | 3/1992 | Hill et al. |
| 5,123,905 A | 6/1992 | Kelman |
| 5,139,501 A | 8/1992 | Klaas |
| 5,171,241 A | 12/1992 | Buboltz et al. |
| 5,176,686 A | 1/1993 | Poley |
| 5,178,622 A | 1/1993 | Lehner, II |
| 5,190,552 A | 3/1993 | Kelman |
| 5,190,553 A | 3/1993 | Kanert et al. |
| 5,222,972 A | 6/1993 | Hill et al. |
| 5,242,450 A | 9/1993 | McDonald |
| 5,259,395 A | 11/1993 | Li |
| 5,275,604 A | 1/1994 | Rheinish et al. |
| 5,281,227 A | 1/1994 | Sussman |
| 5,304,182 A | 4/1994 | Rheinish et al. |
| 5,354,333 A | 10/1994 | Kammann et al. |
| 5,395,378 A | 3/1995 | McDonald |
| 5,425,734 A | 6/1995 | Blake |
| 5,454,818 A | 10/1995 | Hambleton et al. |
| 5,468,246 A | 11/1995 | Blake |
| 5,474,562 A | 12/1995 | Orchowski et al. |
| 5,494,484 A | 2/1996 | Feingold |
| 5,496,328 A | 3/1996 | Nakajima et al. |
| 5,499,987 A | 3/1996 | Feingold |
| 5,562,676 A | 10/1996 | Brady et al. |
| 5,571,113 A | 11/1996 | McDonald |
| 5,578,042 A | 11/1996 | Cumming |
| 5,582,613 A | 12/1996 | Brady |
| 5,582,614 A | 12/1996 | Feingold |
| 5,584,304 A | 12/1996 | Brady |
| 5,616,148 A | 4/1997 | Eagles et al. |
| 5,620,450 A | 4/1997 | Eagles et al. |
| 5,643,275 A | 7/1997 | Blake |
| 5,643,276 A | 7/1997 | Zaleski |
| 5,645,534 A | 7/1997 | Chanoch |
| 5,653,715 A | 8/1997 | Reich et al. |
| 5,653,753 A | 8/1997 | Brady et al. |
| 5,702,402 A | 12/1997 | Brady |
| 5,702,441 A | 12/1997 | Zhou |
| 5,716,364 A | 2/1998 | Makker et al. |
| 5,728,075 A | 3/1998 | Levander |
| 5,728,102 A | 3/1998 | Feingold et al. |
| 5,735,858 A | 4/1998 | Makker et al. |
| 5,766,181 A | 6/1998 | Chambers et al. |
| 5,772,666 A | 6/1998 | Feingold et al. |
| 5,772,667 A | 6/1998 | Blake |
| 5,776,138 A | 7/1998 | Vidal et al. |
| 5,800,442 A | 9/1998 | Wolf et al. |
| 5,803,925 A | 9/1998 | Yang et al. |
| 5,807,400 A | 9/1998 | Chambers et al. |
| 5,810,833 A | 9/1998 | Brady et al. |
| 5,810,834 A | 9/1998 | Heyman |
| 5,860,984 A | 1/1999 | Chambers et al. |
| 5,860,986 A | 1/1999 | Reich et al. |
| 5,868,751 A | 2/1999 | Feingold |
| 5,868,752 A | 2/1999 | Makker et al. |
| 5,873,879 A | 2/1999 | Figueroa et al. |
| 5,876,406 A | 3/1999 | Wolf et al. |
| 5,876,407 A | 3/1999 | Makker et al. |
| 5,876,440 A | 3/1999 | Feingold |
| 5,891,152 A | 4/1999 | Feingold |
| 5,902,307 A | 5/1999 | Feingold et al. |
| 5,919,197 A | 7/1999 | McDonald |
| 5,921,989 A | 7/1999 | Deacon et al. |
| 5,928,245 A | 7/1999 | Wolf et al. |
| 5,941,886 A | 8/1999 | Feingold |
| 5,942,277 A | 8/1999 | Makker et al. |
| 5,944,725 A | 8/1999 | Cicenas |
| 5,947,974 A | 9/1999 | Brady et al. |
| 5,947,975 A | 9/1999 | Kikuchi et al. |
| 5,957,748 A | 9/1999 | Ichiha |
| 5,957,896 A | 9/1999 | Bendek et al. |
| 6,001,107 A | 12/1999 | Feingold |
| 6,010,510 A | 1/2000 | Brown et al. |
| 6,022,358 A | 2/2000 | Wolf et al. |
| 6,048,348 A | 4/2000 | Chambers et al. |
| 6,050,999 A | 4/2000 | Paraschac et al. |
| 6,051,000 A | 4/2000 | Heyman |
| 6,056,757 A | 5/2000 | Feingold et al. |
| 6,056,758 A | 5/2000 | Vidal et al. |
| 6,059,791 A | 5/2000 | Chambers |
| 6,074,397 A | 6/2000 | Chambers et al. |
| 6,083,230 A | 7/2000 | Makker et al. |
| 6,093,193 A | 7/2000 | Makker et al. |
| 6,129,733 A | 10/2000 | Brady et al. |
| 6,142,999 A | 11/2000 | Brady et al. |
| 6,143,000 A | 11/2000 | Feingold |
| 6,162,229 A | 12/2000 | Feingold et al. |
| 6,174,315 B1 | 1/2001 | Chambers et al. |
| 6,214,015 B1 | 4/2001 | Reich et al. |
| 6,241,737 B1 | 6/2001 | Feingold |
| 6,248,111 B1 | 6/2001 | Glick et al. |
| 6,251,114 B1 | 6/2001 | Farmer et al. |
| 6,254,607 B1 | 7/2001 | Makker et al. |
| 6,267,768 B1 | 7/2001 | Deacon |
| 6,283,975 B1 | 9/2001 | Glick et al. |
| 6,283,976 B1 | 9/2001 | Portney |
| 6,312,433 B1 | 11/2001 | Butts |
| 6,334,862 B1 | 1/2002 | Vidal et al. |
| 6,336,932 B1 | 1/2002 | Figueroa et al. |
| 6,355,046 B2 | 3/2002 | Kikuchi et al. |
| 6,371,960 B2 | 4/2002 | Heyman et al. |
| 6,386,357 B1 | 5/2002 | Egawa |
| 6,387,101 B1 | 5/2002 | Butts et al. |
| 6,398,788 B1 | 6/2002 | Makker et al. |
| 6,406,481 B2 | 6/2002 | Feingold et al. |
| 6,428,545 B2 | 8/2002 | Portney |
| 6,447,519 B1 | 9/2002 | Brady et al. |
| 6,447,520 B1 | 9/2002 | Ott et al. |
| 6,468,282 B2 | 10/2002 | Kikuchi et al. |
| 6,471,708 B2 | 10/2002 | Green |
| 6,491,697 B1 | 12/2002 | Clark et al. |
| 6,497,708 B1 | 12/2002 | Cumming |
| 6,500,181 B1 | 12/2002 | Portney |

(56) References Cited

U.S. PATENT DOCUMENTS

| | | |
|---|---|---|
| 6,503,275 B1 | 1/2003 | Cumming |
| 6,506,195 B2 | 1/2003 | Chambers et al. |
| 6,537,283 B2 | 3/2003 | Van Noy |
| 6,540,754 B2 | 4/2003 | Brady |
| 6,554,839 B2 | 4/2003 | Brady |
| 6,558,395 B2 | 5/2003 | Hjertman et al. |
| 6,605,093 B1 | 8/2003 | Blake |
| 6,607,537 B1 | 8/2003 | Binder |
| 6,629,979 B1 | 10/2003 | Feingold |
| 6,666,871 B2 | 12/2003 | Kikuchi et al. |
| 6,679,891 B2 | 1/2004 | Makker et al. |
| 6,685,740 B2 | 2/2004 | Figueroa et al. |
| 6,712,848 B1 | 3/2004 | Wolf et al. |
| 6,723,104 B2 | 4/2004 | Ott |
| 6,733,507 B2 | 5/2004 | McNicholas et al. |
| 6,749,631 B1 | 6/2004 | Pietrini et al. |
| 6,793,674 B2 | 9/2004 | Zapata |
| 6,858,033 B2 | 2/2005 | Kobayashi |
| 6,921,405 B2 | 7/2005 | Feingold et al. |
| 6,923,815 B2 | 8/2005 | Brady et al. |
| 6,976,989 B1 | 12/2005 | Vincent |
| 7,014,641 B2 | 3/2006 | Kobayashi et al. |
| 7,025,782 B2 | 4/2006 | Kobayashi et al. |
| 7,033,366 B2 | 4/2006 | Brady |
| 7,037,312 B2 | 5/2006 | Kikuchi et al. |
| 7,074,227 B2 | 7/2006 | Portney |
| 7,097,649 B2 | 8/2006 | Meyer |
| 7,131,976 B2 | 11/2006 | Kobayashi et al. |
| 7,156,854 B2 | 1/2007 | Brown et al. |
| 7,348,038 B2 | 3/2008 | Makker et al. |
| 7,422,604 B2 | 9/2008 | Vaquero et al. |
| 7,429,263 B2 | 9/2008 | Vaquero et al. |
| 7,458,976 B2 | 12/2008 | Peterson et al. |
| 7,476,230 B2 | 1/2009 | Ohno et al. |
| 7,494,505 B2 | 2/2009 | Kappelhof et al. |
| 7,645,300 B2 | 1/2010 | Tsai |
| 8,273,122 B2 | 9/2012 | Anderson |
| 8,382,769 B2 | 2/2013 | Inoue |
| 8,460,311 B2 | 6/2013 | Ishii |
| 8,470,032 B2 | 6/2013 | Inoue et al. |
| 8,475,526 B2 | 7/2013 | Pynson |
| 8,475,528 B2 | 7/2013 | Ichinohe et al. |
| 8,523,877 B2 | 9/2013 | Ichinohe et al. |
| 8,523,941 B2 | 9/2013 | Ichinohe et al. |
| 8,535,375 B2 | 9/2013 | Ichinohe et al. |
| 8,545,512 B2 | 10/2013 | Ichinohe et al. |
| 8,574,239 B2 | 11/2013 | Ichinohe et al. |
| 8,603,103 B2 | 12/2013 | Kudo et al. |
| 8,647,382 B2 | 2/2014 | Kudo et al. |
| 8,702,795 B2 | 4/2014 | Shoji et al. |
| 8,747,465 B2 | 6/2014 | Someya et al. |
| 8,968,328 B2 | 3/2015 | Ichinohe et al. |
| 9,114,006 B2 | 8/2015 | Inoue |
| 9,114,007 B2 | 8/2015 | Ichinohe et al. |
| 9,186,246 B2 | 11/2015 | Inoue |
| 9,220,593 B2 | 12/2015 | Ichinohe |
| 9,237,947 B2 | 1/2016 | Valle |
| 9,289,288 B2 | 3/2016 | Someya et al. |
| 9,314,373 B2 | 4/2016 | Kudo et al. |
| 9,326,847 B2 | 5/2016 | Sanger |
| 9,364,320 B2 | 6/2016 | Ichinohe et al. |
| 9,554,894 B2 | 1/2017 | Inoue |
| 9,572,710 B1 | 2/2017 | Kudo et al. |
| 9,655,718 B2 | 5/2017 | Kudo |
| 9,687,340 B2 | 6/2017 | Anderson |
| 9,877,826 B2 | 1/2018 | Kudo et al. |
| 9,901,442 B2 | 2/2018 | Kudo et al. |
| 9,907,647 B2 | 3/2018 | Inoue |
| 9,980,811 B2 | 5/2018 | Kudo et al. |
| 10,039,668 B2 | 8/2018 | Kudo et al. |
| 10,231,826 B2 | 3/2019 | Hangya et al. |
| 10,383,723 B2 | 8/2019 | Kudo |
| 10,390,940 B2 | 8/2019 | Someya et al. |
| 10,405,971 B2 | 9/2019 | Someya et al. |
| 10,517,717 B2 | 12/2019 | Inoue |
| 10,799,339 B2 | 10/2020 | Kudo et al. |
| 10,849,738 B2 | 12/2020 | Kudo et al. |
| 11,033,382 B2 | 6/2021 | Watanabe et al. |
| 11,439,499 B2 | 9/2022 | Wensrich et al. |
| 11,938,019 B2 | 3/2024 | Someya et al. |
| 12,076,231 B2 | 9/2024 | Noda et al. |
| 12,257,145 B2 | 3/2025 | Kudo |
| 2001/0007942 A1 | 7/2001 | Kikuchi et al. |
| 2001/0020171 A1 | 9/2001 | Heyman |
| 2002/0082609 A1* | 6/2002 | Green ............... A61F 2/1691 606/107 |
| 2002/0103490 A1 | 8/2002 | Brady |
| 2002/0151904 A1 | 10/2002 | Feingold et al. |
| 2002/0165610 A1 | 11/2002 | Waldock |
| 2002/0193805 A1 | 12/2002 | Ott et al. |
| 2003/0036765 A1 | 2/2003 | Van Noy |
| 2003/0040755 A1 | 2/2003 | Meyer |
| 2003/0050647 A1 | 3/2003 | Brady |
| 2003/0088253 A1 | 5/2003 | Seil |
| 2003/0139749 A1 | 7/2003 | Kikuchi et al. |
| 2003/0181921 A1 | 9/2003 | Jeannin |
| 2003/0195522 A1 | 10/2003 | McNicholas |
| 2003/0212406 A1 | 11/2003 | Kobayashi et al. |
| 2003/0212407 A1 | 11/2003 | Kikuchi |
| 2003/0212408 A1 | 11/2003 | Kobayashi |
| 2003/0212409 A1 | 11/2003 | Kobayashi et al. |
| 2004/0039345 A1 | 2/2004 | Benz et al. |
| 2004/0111094 A1 | 6/2004 | Meyer |
| 2004/0116937 A1 | 6/2004 | Portney |
| 2004/0117012 A1 | 6/2004 | Vincent |
| 2004/0127911 A1 | 7/2004 | Figueroa |
| 2004/0147938 A1 | 7/2004 | Dusek et al. |
| 2004/0186428 A1 | 9/2004 | Ray |
| 2004/0238392 A1 | 12/2004 | Peterson et al. |
| 2004/0243141 A1 | 12/2004 | Brown et al. |
| 2005/0033308 A1 | 2/2005 | Callahan et al. |
| 2005/0049605 A1 | 3/2005 | Vaquero et al. |
| 2005/0049606 A1 | 3/2005 | Vaquero et al. |
| 2005/0055011 A1 | 3/2005 | Enggaard |
| 2005/0125000 A1 | 6/2005 | Tourrette et al. |
| 2005/0143750 A1 | 6/2005 | Vaquero |
| 2005/0182419 A1 | 8/2005 | Tsai |
| 2005/0222578 A1 | 10/2005 | Vaquero |
| 2005/0261703 A1 | 11/2005 | Feingold et al. |
| 2006/0085013 A1 | 4/2006 | Dusek |
| 2006/0142781 A1 | 6/2006 | Pynson et al. |
| 2006/0167466 A1 | 7/2006 | Dusek |
| 2006/0173540 A1 | 8/2006 | Vincent |
| 2006/0200167 A1 | 9/2006 | Peterson et al. |
| 2006/0229633 A1 | 10/2006 | Shepherd |
| 2006/0235429 A1 | 10/2006 | Lee et al. |
| 2006/0293694 A1 | 12/2006 | Futamura |
| 2007/0000801 A1 | 1/2007 | Mauran et al. |
| 2007/0005135 A1 | 1/2007 | Makker et al. |
| 2007/0168026 A1 | 7/2007 | Nagasaka |
| 2007/0173860 A1 | 7/2007 | Iwasaki |
| 2007/0270945 A1 | 11/2007 | Kobayashi |
| 2008/0027460 A1 | 1/2008 | Kobayashi |
| 2008/0033449 A1 | 2/2008 | Cole et al. |
| 2008/0058830 A1 | 3/2008 | Cole et al. |
| 2008/0086146 A1 | 4/2008 | Ishii et al. |
| 2008/0097459 A1 | 4/2008 | Kammerlander et al. |
| 2008/0221584 A1 | 9/2008 | Downer |
| 2009/0036898 A1 | 2/2009 | Ichinohe |
| 2009/0043313 A1 | 2/2009 | Ichinohe |
| 2009/0112223 A1 | 4/2009 | Downer et al. |
| 2009/0125034 A1 | 5/2009 | Pynson |
| 2009/0138022 A1 | 5/2009 | Tu et al. |
| 2009/0204122 A1 | 8/2009 | Ichinohe et al. |
| 2009/0216244 A1 | 8/2009 | Pynson |
| 2009/0248031 A1 | 10/2009 | Ichinohe |
| 2009/0270876 A1 | 10/2009 | Hoffmann et al. |
| 2009/0292293 A1 | 11/2009 | Bogaert et al. |
| 2010/0082037 A1 | 4/2010 | Kobayashi et al. |
| 2010/0094309 A1 | 4/2010 | Hboukhny et al. |
| 2010/0106160 A1 | 4/2010 | Tsai |
| 2010/0161049 A1 | 6/2010 | Inoue |
| 2010/0185206 A1 | 7/2010 | Ichinohe et al. |
| 2010/0217273 A1 | 8/2010 | Someya et al. |

(56) References Cited

U.S. PATENT DOCUMENTS

| | | |
|---|---|---|
| 2010/0286704 A1 | 11/2010 | Ichinohe et al. |
| 2010/0331808 A1 | 12/2010 | Py et al. |
| 2011/0046633 A1 | 2/2011 | Pankin et al. |
| 2011/0046635 A1 | 2/2011 | Pankin et al. |
| 2011/0082463 A1 | 4/2011 | Inoue |
| 2011/0098717 A1 | 4/2011 | Inoue |
| 2011/0144654 A1 | 6/2011 | Isaacs et al. |
| 2011/0172676 A1 | 7/2011 | Chen |
| 2011/0264101 A1 | 10/2011 | Inoue et al. |
| 2011/0270264 A1 | 11/2011 | Shoji et al. |
| 2011/0288557 A1 | 11/2011 | Kudo et al. |
| 2012/0022548 A1 | 1/2012 | Zacharias |
| 2012/0022549 A1 | 1/2012 | Someya et al. |
| 2012/0071887 A1 | 3/2012 | Ichinohe et al. |
| 2012/0123438 A1 | 5/2012 | Horvath et al. |
| 2012/0221102 A1* | 8/2012 | Tanaka ............... A61F 2/167 623/6.12 |
| 2013/0006259 A1 | 1/2013 | Sanger |
| 2013/0018460 A1 | 1/2013 | Anderson |
| 2013/0085507 A1 | 4/2013 | Nagasaka |
| 2013/0226193 A1 | 8/2013 | Kudo et al. |
| 2013/0245635 A1 | 9/2013 | Inoue |
| 2013/0345713 A1 | 12/2013 | Cole et al. |
| 2014/0081284 A1 | 3/2014 | Ichinohe et al. |
| 2014/0107660 A1 | 4/2014 | Ichinohe et al. |
| 2014/0114323 A1 | 4/2014 | Kudo et al. |
| 2014/0135784 A1 | 5/2014 | Maroscheck et al. |
| 2014/0180299 A1 | 6/2014 | Ichinohe et al. |
| 2014/0180300 A1 | 6/2014 | Ichinohe et al. |
| 2014/0194890 A1 | 7/2014 | Kudo et al. |
| 2014/0200588 A1 | 7/2014 | Anderson et al. |
| 2014/0276901 A1 | 9/2014 | Auld |
| 2014/0296863 A1 | 10/2014 | Anderson et al. |
| 2015/0045805 A1 | 2/2015 | Kontur et al. |
| 2015/0327992 A1 | 11/2015 | Wagner et al. |
| 2016/0000556 A1 | 1/2016 | Perera |
| 2016/0058554 A1 | 3/2016 | Anderson et al. |
| 2016/0113759 A1 | 4/2016 | Inoue |
| 2016/0151150 A1 | 6/2016 | Sato |
| 2016/0193038 A1 | 7/2016 | Kudo et al. |
| 2016/0256316 A1 | 9/2016 | Van Noy |
| 2016/0270907 A1 | 9/2016 | Attinger |
| 2016/0331587 A1 | 11/2016 | Yamada et al. |
| 2016/0346077 A1 | 12/2016 | Someya et al. |
| 2017/0079772 A1 | 3/2017 | Kudo |
| 2017/0119522 A1 | 5/2017 | Auld et al. |
| 2017/0151056 A1* | 6/2017 | Inoue ............... A61F 2/1664 |
| 2017/0202662 A1 | 7/2017 | Someya et al. |
| 2017/0252149 A1 | 9/2017 | Kudo et al. |
| 2017/0252150 A1 | 9/2017 | Kudo et al. |
| 2017/0258582 A1 | 9/2017 | Kudo et al. |
| 2017/0354493 A1 | 12/2017 | Andersen et al. |
| 2018/0014996 A1 | 1/2018 | Asbaghi |
| 2018/0200046 A1* | 7/2018 | Brown ............... A61F 2/1691 |
| 2018/0250125 A1* | 9/2018 | Kudo ............... A61F 2/1667 |
| 2018/0353287 A1 | 12/2018 | Kudo et al. |
| 2019/0151078 A1 | 5/2019 | Watanabe et al. |
| 2019/0192284 A1 | 6/2019 | Watanabe et al. |
| 2020/0113674 A1 | 4/2020 | Someya et al. |
| 2021/0145570 A1 | 5/2021 | Kudo |
| 2021/0161653 A1 | 6/2021 | Noda et al. |
| 2023/0033115 A1 | 2/2023 | Watanabe et al. |
| 2023/0225858 A1 | 7/2023 | Someya et al. |
| 2023/0301833 A1 | 9/2023 | Wu |
| 2023/0372083 A1 | 11/2023 | Kudo |
| 2024/0374376 A1 | 11/2024 | Noda et al. |
| 2024/0415634 A1 | 12/2024 | Kudo |

FOREIGN PATENT DOCUMENTS

| | | |
|---|---|---|
| DE | 3610925 | 10/1987 |
| DE | 4110278 | 10/1992 |
| DE | 19544119 A1 | 5/1997 |
| DE | 20219445 U1 | 3/2003 |
| EP | 0363213 | 4/1990 |
| EP | 0727966 | 9/2003 |
| EP | 1360947 A1 | 11/2003 |
| EP | 1502559 A1 | 2/2005 |
| EP | 1790317 A2 | 5/2007 |
| EP | 1808150 A1 | 7/2007 |
| EP | 1832247 A1 | 9/2007 |
| EP | 1338254 | 12/2008 |
| EP | 2074961 A1 | 7/2009 |
| EP | 2255751 A1 | 12/2010 |
| EP | 2286763 A1 | 2/2011 |
| EP | 2286764 A1 | 2/2011 |
| EP | 2368526 A1 | 9/2011 |
| EP | 2574308 A2 | 4/2013 |
| EP | 2853236 A2 | 4/2015 |
| EP | 3391855 A1 | 10/2018 |
| FR | 2749752 A | 12/1997 |
| JP | 63-197453 A | 8/1988 |
| JP | 4-212350 A | 8/1992 |
| JP | 5-103803 A | 4/1993 |
| JP | 5-103808 | 4/1993 |
| JP | 5-103809 | 4/1993 |
| JP | 08-019558 A | 1/1996 |
| JP | 8-024282 A | 1/1996 |
| JP | 8-505540 | 6/1996 |
| JP | 9-506285 A | 6/1997 |
| JP | 11-113939 A | 4/1999 |
| JP | 11-506357 A | 6/1999 |
| JP | 2000-516487 A | 12/2000 |
| JP | 2000-516488 A | 12/2000 |
| JP | 2001-502563 | 2/2001 |
| JP | 2001-104347 A | 4/2001 |
| JP | 2001-259033 | 9/2001 |
| JP | 2002-516709 A | 6/2002 |
| JP | 2002-355268 A | 12/2002 |
| JP | 2002-541912 A | 12/2002 |
| JP | 2003-144480 A | 5/2003 |
| JP | 3412106 B2 | 6/2003 |
| JP | 2003-210498 A | 7/2003 |
| JP | 2003-527162 A | 9/2003 |
| JP | 2003-325569 A | 11/2003 |
| JP | 2003-325570 A | 11/2003 |
| JP | 2003-325572 A | 11/2003 |
| JP | 2004-024854 A | 1/2004 |
| JP | 2004-041271 A | 2/2004 |
| JP | 2004-188194 A | 7/2004 |
| JP | 2004-344213 A | 12/2004 |
| JP | 2004-351196 A | 12/2004 |
| JP | 2006-014963 A | 1/2006 |
| JP | 2006-181269 A | 7/2006 |
| JP | 2006-297146 A | 11/2006 |
| JP | 2006-333924 A | 12/2006 |
| JP | 2006-333980 A | 12/2006 |
| JP | 2006-333981 A | 12/2006 |
| JP | 2007-503872 A | 3/2007 |
| JP | 2007-152010 A | 6/2007 |
| JP | 2007-181604 A | 7/2007 |
| JP | 2007-222309 A | 9/2007 |
| JP | 2007-244570 A | 9/2007 |
| JP | 2007-526091 A | 9/2007 |
| JP | 2007-307168 A1 | 11/2007 |
| JP | 2008-012016 A | 1/2008 |
| JP | 2008-521535 A | 6/2008 |
| JP | 2008-212689 A | 9/2008 |
| JP | 2008-237274 A | 10/2008 |
| JP | 2009-028223 A | 2/2009 |
| JP | 2009-072221 A | 4/2009 |
| JP | 2011-019987 A | 2/2011 |
| JP | 2011-087976 A | 5/2011 |
| JP | 2011-160858 A | 8/2011 |
| JP | 2011-160859 A | 8/2011 |
| JP | 2013-144163 A | 7/2013 |
| JP | 2014-050484 A | 3/2014 |
| JP | 2014-079630 A | 5/2014 |
| JP | 2016-137122 A | 8/2016 |
| WO | WO9407436 A1 | 4/1994 |
| WO | WO9513022 A1 | 5/1995 |
| WO | WO9628122 A1 | 9/1996 |
| WO | WO9715253 A1 | 5/1997 |

(56) References Cited

FOREIGN PATENT DOCUMENTS

| | | |
|---|---|---|
| WO | WO9812969 A1 | 4/1998 |
| WO | WO9937247 A1 | 7/1999 |
| WO | WO9958086 A1 | 11/1999 |
| WO | WO9959668 A1 | 11/1999 |
| WO | WO0045746 A1 | 8/2000 |
| WO | WO0062712 A1 | 10/2000 |
| WO | WO2002071982 A1 | 9/2002 |
| WO | WO2002096322 A1 | 12/2002 |
| WO | WO2004/041323 A2 | 5/2004 |
| WO | WO2004105649 A1 | 12/2004 |
| WO | WO2005023154 A1 | 3/2005 |
| WO | WO2005030097 A1 | 4/2005 |
| WO | WO2005070341 A1 | 8/2005 |
| WO | WO2005084588 A1 | 9/2005 |
| WO | WO2006070628 A1 | 7/2006 |
| WO | WO2006080191 A1 | 8/2006 |
| WO | WO2006090531 A1 | 8/2006 |
| WO | WO2007037223 A1 | 4/2007 |
| WO | WO2007097221 A1 | 4/2007 |
| WO | WO2007080869 A1 | 7/2007 |
| WO | WO2008149794 A1 | 12/2008 |
| WO | WO2008149795 A1 | 12/2008 |
| WO | WO2009058929 A1 | 7/2009 |
| WO | WO2009148091 A1 | 12/2009 |
| WO | WO2010028873 A1 | 3/2010 |
| WO | WO2010064970 A1 | 6/2010 |
| WO | WO2011126144 A1 | 10/2011 |
| WO | WO2011155636 A1 | 12/2011 |
| WO | WO2012086797 A1 | 6/2012 |
| WO | WO2012155887 A1 | 11/2012 |
| WO | WO2015012312 A1 | 1/2015 |
| WO | WO2016191764 A1 | 12/2016 |
| WO | WO2019130028 A1 | 7/2019 |

OTHER PUBLICATIONS

PCT International Search Report dated Mar. 10, 2020 for PCT App. Ser. No. PCT/JP2019/050238.
U.S. Appl. No. 16/550,144, filed Aug. 23, 2019, US 20200113674A1.
U.S. Appl. No. 17/055,253, filed Nov. 13, 2020, US 2021061653A1.
U.S. Appl. No. 17/055,253, filed Nov. 13, 2020, US 20210161653A1.
PCT International Preliminary Examination Report (English Translation) dated Aug. 25, 2021 for PCT App. Ser. No. PCT/JP2019/050238.
U.S. Appl. No. 18/186,167, filed Mar. 18, 2023, US 20230225858A1.
U.S. Appl. No. 17/055,253, Nov. 13, 2020, US 20210161653A1.
U.S. Appl. No. 17/055,186, Nov. 13, 2020, US 20210145570A1.
U.S. Appl. No. 17/801,364, filed Aug. 22, 2022.
U.S. Appl. No. 12/602,442, filed Dec. 15, 2009, U.S. Pat. No. 8,747,465.
U.S. Appl. No. 13/244,449, filed Sep. 24, 2011, U.S. Pat. No. 9,289,288.
U.S. Appl. No. 15/063,395, filed Mar. 7, 2016, U.S. Pat. No. 10,390,940.
U.S. Appl. No. 15/476,717, filed Mar. 31, 2017, U.S. Pat. No. 10,405,971.
U.S. Appl. No. 16/550,144, filed Aug. 23, 2019, U.S. Pat. No. 11,617,643.
U.S. Appl. No. 18/186,167, filed Mar. 18, 2023, U.S. Pat. No. 11,938,019.
U.S. Appl. No. 12/602,454, filed Dec. 15, 2009, U.S. Pat. No. 8,475,528.
U.S. Appl. No. 13/244,452, filed Sep. 24, 2011, U.S. Pat. No. 8,535,375.
U.S. Appl. No. 12/667,510, filed Dec. 31, 2009, U.S. Pat. No. 9,114,006.
U.S. Appl. No. 14/812,104, filed Jul. 29, 2015, U.S. Pat. No. 9,907,647.
U.S. Appl. No. 12/995,263, filed Dec. 15, 2010, U.S. Pat. No. 9,554,894.
U.S. Appl. No. 15/382,377, filed Dec. 16, 2016, U.S. Pat. No. 10,517,717.
U.S. Appl. No. 12/997,651, filed Dec. 13, 2010, U.S. Pat. No. 8,382,769.
U.S. Appl. No. 13/757,790, filed Feb. 2, 2012, U.S. Pat. No. 9,186,246.
U.S. Appl. No. 13/583,216, filed Apr. 6, 2011, U.S. Pat. No. 9,326,847.
U.S. Appl. No. 13/699,708, filed Jun. 8, 2011, U.S. Pat. No. 8,647,382.
U.S. Appl. No. 14/145,846, filed Dec. 31, 2013, U.S. Pat. No. 9,314,373.
U.S. Appl. No. 15/071,880, filed Mar. 16, 2016, U.S. Pat. No. 10,039,668.
U.S. Appl. No. 15/336,678, filed Oct. 27, 2016, U.S. Pat. No. 9,572,710.
U.S. Appl. No. 15/608,895, filed May 30, 2017, U.S. Pat. No. 9,980,811.
U.S. Appl. No. 13/059,401, filed Feb. 16, 2011, U.S. Pat. No. 8,702,795.
U.S. Appl. No. 13/061,143, filed Feb. 26, 2011, U.S. Pat. No. 8,470,032.
U.S. Appl. No. 13/143,322, filed Jul. 5, 2011, U.S. Pat. No. 8,603,103.
U.S. Appl. No. 14/099,989, filed Dec. 8, 2013, U.S. Pat. No. 9,655,718.
U.S. Appl. No. 15/600,679, filed May 19, 2017, U.S. Pat. No. 9,877,826.
U.S. Appl. No. 15/600,684, filed May 19, 2017, U.S. Pat. No. 9,901,442.
U.S. Appl. No. 11/814,508, filed Jul. 23, 2007, U.S. Pat. No. 8,545,512.
U.S. Appl. No. 14/033,888, filed Sep. 23, 2013, U.S. Pat. No. 9,220,593.
U.S. Appl. No. 11/816,676, filed Aug. 20, 2007, U.S. Pat. No. 8,523,877.
U.S. Appl. No. 13/966,209, filed Aug. 13, 2013, U.S. Pat. No. 9,364,320.
U.S. Appl. No. 12/095,172, filed May 28, 2008, U.S. Pat. No. 8,523,941.
U.S. Appl. No. 14/011,018, filed Aug. 27, 2013, U.S. Pat. No. 8,968,328.
U.S. Appl. No. 12/088,328, filed Mar. 27, 2008, U.S. Pat. No. 8,574,239.
U.S. Appl. No. 14/065,365, filed Oct. 28, 2013, U.S. Pat. No. 9,114,007.
U.S. Appl. No. 11/722,601, filed Apr. 10, 2008, U.S. Pat. No. 8,460,311.
U.S. Appl. No. 15/126,277, filed Sep. 14, 2016, U.S. Pat. No. 10,383,723.
U.S. Appl. No. 15/756,565, filed Feb. 28, 2018, U.S. Pat. No. 10,849,738.
U.S. Appl. No. 15/756,569, filed Feb. 28, 2018, U.S. Pat. No. 10,799,339.
U.S. Appl. No. 16/313,180, filed Dec. 26, 2018, US 20190192284A1.
U.S. Appl. No. 16/313,184, filed Dec. 26, 2018, U.S. Pat. No. 11,033,382.
U.S. Appl. No. 17/055,253, filed Nov. 13, 2020, U.S. Pat. No. 12,076,231.
U.S. Appl. No. 18/778,973, filed Jul. 20, 2024, US 20240374376A1.
U.S. Appl. No. 17/055,186, filed Nov. 13, 2020, US 20210145570A1.
U.S. Appl. No. 17/435,762, filed Sep. 2, 2021, US 20220151767A1.
U.S. Appl. No. 17/801,364, filed Aug. 22, 2022, US 20230033115A1.
U.S. Appl. No. 18/044,235, filed Mar. 7, 2023, US 20230372083A1.
U.S. Appl. No. 18/694,985, filed Mar. 24, 2023.

* cited by examiner

INTRAOCULAR LENS INJECTOR

TECHNICAL FIELD

The present invention relates to an intraocular lens injector.

BACKGROUND ART

In cataract surgery, removal of an opacified crystalline lens by phacoemulsification and implantation of an intraocular lens into an eye after the removal of the crystalline lens are widely performed. Nowadays, a soft intraocular lens made of a soft material such as silicone elastomer is injected into an eye using an intraocular lens injector.

When injecting a soft intraocular lens into an eye, it is possible to fold the intraocular lens, and therefore, cataract surgery can be performed with a smaller corneal incision.

A method for folding an intraocular lens is known in which the intraocular lens is folded within an intraocular lens injector (for example, Patent Document 1 to the applicant of the present invention). According to the method disclosed in Patent Document 1, a protrusion is provided to a case, and when the intraocular lens injector and the case are fitted to each other, the protrusion of the case protrudes from a protrusion insertion hole formed in the intraocular lens injector (paragraph 0038 and FIGS. 3 to 6, etc.).

In this state, the intraocular lens including a substantially disk-shaped optical portion having an optical function and a pair of support portions extending from the optical portion is advanced toward a discharge hole of a nozzle portion. As the intraocular lens is advanced, a leading end of a forward support portion of the intraocular lens abuts against the protrusion and can thus be bent rearward (paragraph 0041 and FIGS. 6 and 7, etc.).

CITATION LIST

Patent Documents

Patent Document 1: Japanese Patent No. 5254669

SUMMARY OF INVENTION

Technical Problem

With the method disclosed in Patent Document 1, the forward support portion of the intraocular lens can be bent rearward. On the other hand, as a result of examination by the inventor of the present invention, it was found that this method can cause the following phenomenon.

With the method disclosed in Patent Document 1, due to the advancement of the intraocular lens, the forward support portion of the intraocular lens is bent rearward, and the optical portion of the intraocular lens is folded. It is ideal that a surface (hereinafter referred to as an "inner surface") that faces inward when the optical portion is folded wraps around the forward support portion. Such an ideally folded state is also referred to as "tacking".

On the other hand, as a result of examination by the inventor of the present invention, it was found that, when the intraocular lens is advancing, there is a risk that the forward support portion will enter between an outer surface of the optical portion that is the opposite surface to the inner surface and an inner wall of the intraocular lens injector.

If the forward support portion enters between the outer surface of the optical portion and the inner wall of the intraocular lens injector, an operating surgeon has to undo the distorted bend of the forward support portion after releasing the intraocular lens, or in other words, in an eye of a patient. In that case, a large burden is placed on the operating surgeon.

It is a technical object of the present invention to provide an intraocular lens injector that improves the accuracy of tacking.

Solution to Problem

The inventor of the present invention has conducted an in-depth study to achieve the above object. In the study, the inventor of the present invention focused on the movement of the forward support portion when abutting against the protrusion disclosed in Patent Document 1. As a result, it became clear that, with the protrusion disclosed in Patent Document 1, during the advancement of the entire intraocular lens in a forward direction, the timing of movement of the leading end of the forward support portion to the vicinity of the inner wall of the intraocular lens injector as a result of the forward support portion continuing to bend rearward and the timing of advancement of a peripheral edge of the optical portion of the folded intraocular lens tend to be extremely close to each other, or the leading end of the forward support portion tends to move to the inner wall in advance.

Thus, in order to intentionally shift these timings from each other, the inventor of the present invention conceived a technical idea of temporarily retaining the leading end of the forward support portion bending rearward during the advancement of the entire intraocular lens, thereby suppressing the bending of the forward support portion and delaying the timing of the movement of the leading end of the forward support portion to the vicinity of the inner wall of the intraocular lens injector.

Configurations obtained based on the above-described findings are as follows.

A first aspect of the present invention is
an intraocular lens injector for injecting an intraocular lens into an eye, the intraocular lens including an optical portion having an optical function and support portions extending from the optical portion, the intraocular lens injector including:
a protrusion for bending a forward support portion while abutting against the forward support portion, the forward support portion being one of the support portions and being disposed on the front side in an advancing direction of the intraocular lens, when making the intraocular lens advance along an inner wall of a hollow body in which the intraocular lens is set and thereby releasing the intraocular lens from the hollow body in a state in which the intraocular lens is folded with an inner surface of the optical portion facing inward,
wherein the protrusion has a retainer that temporarily suppresses progress of bending of the forward support portion by retaining the forward support portion, when the intraocular lens is being folded.

A second aspect of the present invention is the invention according to the first aspect, including:
the hollow body which is an injector main body;
a lens setting portion provided inside the hollow body;
an advancing member for advancing the intraocular lens disposed in the lens setting portion;
the protrusion which is disposed forward of the lens setting portion and protrudes from the inner wall of the hollow body; and an injection tube disposed at a front end portion of the hollow body, the injection tube having a hollow injection tube body and a tubular nozzle portion, the protrusion having a first abutting portion for bending the forward support portion while abutting against the forward support portion when the intraocular lens is being advanced by the advancing member, and the retainer disposed forward of the first abutting portion, and the retainer having a support receiving portion for supporting the forward support portion after the forward support portion is separated from the first abutting portion, and a second abutting portion which is disposed forward of the support receiving portion and abuts against the forward support portion while the forward support portion is supported by the support receiving portion.

A third aspect of the present invention is the invention according to the second aspect, wherein a part between the first abutting portion and the retainer are chamfered.

A fourth aspect of the present invention is an intraocular lens injector for injecting an intraocular lens into an eye, the intraocular lens including an optical portion and support portions extending from the optical portion, the intraocular lens injector including:

a hollow body having a lens setting portion on which the intraocular lens is set, with an optical axis direction of the intraocular lens serving as a vertical direction; and a protrusion protruding from an inner wall of the hollow body, and having at least one step directed upward when viewed from the lens setting portion in a forward direction, and a wall disposed forward of the step.

A fifth aspect of the present invention is the invention according to the fourth aspect, wherein the protrusion protrudes from bottom to top of the inner wall of the hollow body, and has at least two steps directed upward when viewed from the lens setting portion in the forward direction.

A sixth aspect of the present invention is the invention according to any one of the first to fifth aspects, wherein a slope is disposed at a rearmost side of the protrusion.

A seventh aspect of the present invention is the invention according to any one of the first to sixth aspects, further including:

a case configured to be fitted to the hollow body, wherein the protrusion is provided to the case and a hole is formed in the hollow body so that the protrusion and the hole can be fitted to each other.

An eighth aspect of the present invention is the invention according to any one of the first to seventh aspects, further including:

the intraocular lens, wherein the optical portion and a base end of each support portion in the intraocular lens are made of a soft material, and the optical portion of the intraocular lens has an effective optical portion exhibiting an optical function, and a flat peripheral portion disposed around the effective optical portion.

Advantageous Effects of Invention

According to the present invention, it is possible to provide an intraocular lens injector that improves the accuracy of tacking.

DESCRIPTION OF EMBODIMENTS

Hereinafter, an embodiment of the present invention will be described in detail with reference to the drawings. In the present specification, "to" between numerical values means being greater than or equal to a predetermined numerical value and less than or equal to a predetermined numerical value.

In the present embodiment, in order to describe relative positional relationships between various portions of an intraocular lens injector, directions in which they move, and the like, one of the directions along the X-axis is referred to as a "direction X1" and the other direction as a "direction X2", one of the directions along the Y-axis is referred to as a "direction Y1" and the other direction as a "direction Y2", and one of the directions along the Z-axis is referred to as a "direction Z1" and the other direction as a "direction Z2". Moreover, the direction X1 is defined as a leading end side (forward, a lens advancing direction), the direction X2 is defined as a rear end side (rearward), the direction Y1 is defined as a left side (leftward), the direction Y2 is defined as a right side (rightward), the direction Z1 is defined as a top side (upward, a thickness direction and an optical axis direction of an intraocular lens when it is disposed), and the direction Z2 is defined as a bottom side (downward). Of these directions, the directions X1 and X2 correspond to a length direction of an intraocular lens injector 1, the directions Y1 and Y2 correspond to a width direction of the intraocular lens injector, and the directions Z1 and Z2 correspond to a height direction of the intraocular lens injector 1.

Note that it should be mentioned in advance that main characterizing portions of the present embodiment correspond to aspects of a protrusion 21 (FIGS. 3 to 6 etc. of the first embodiment of Patent Document 1), a protrusion 52 (FIG. 7 etc. of the second embodiment of Patent Document 1), and a protrusion 80 (FIGS. 8, 10, and 11, etc. of the third embodiment of Patent Document 1) disclosed in Patent Document 1. For this reason, descriptions of portions other than those related to a protrusion for bending a forward support portion of the intraocular lens injector are simplified.

Configurations of known intraocular lens injectors may be adopted for portions other than those related to the protrusion for bending the forward support portion. For example, configurations disclosed in WO 2018/003854 etc. to the applicant of the present invention may be adopted. For content that is not described below, configurations of known intraocular lens injectors (e.g., configurations disclosed in WO 2018/003854) are adopted, and the description of WO 2018/003854 is incorporated in the present specification in its entirety.

Configuration of Intraocular Lens Injector

Figure 1:
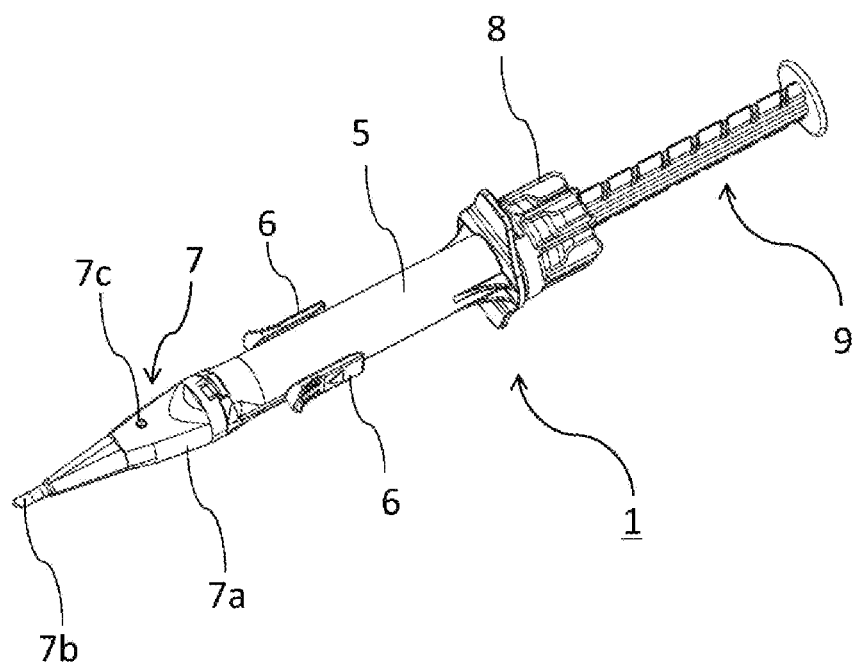
FIG. 1 is a perspective view showing an example of an external configuration of an intraocular lens injector according to an embodiment of the present invention.
Figure 1:
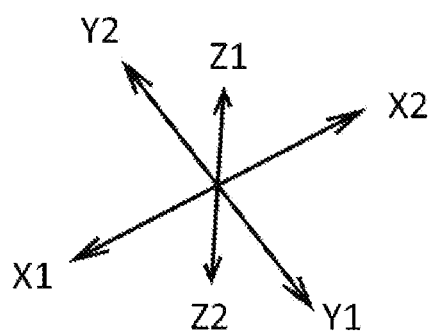

FIG. 1 is a perspective view showing an example of an external configuration of an intraocular lens injector according to an embodiment of the present invention.

Figure 2:
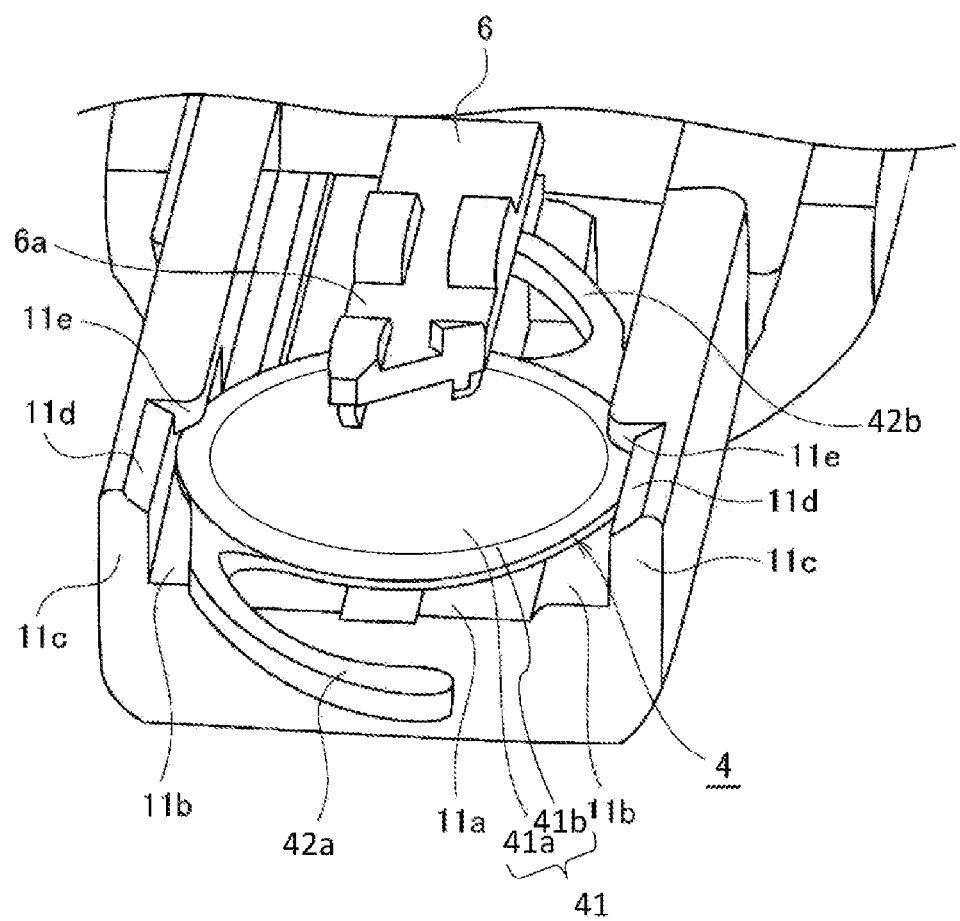
FIG. 2 is a perspective view showing a structure and an arrangement of a leading end portion of an injector main body according to the embodiment of the present invention.

FIG. 2 is a perspective view showing a structure and an arrangement of a leading end portion of an injector main body according to the embodiment of the present invention.

Figure 6:
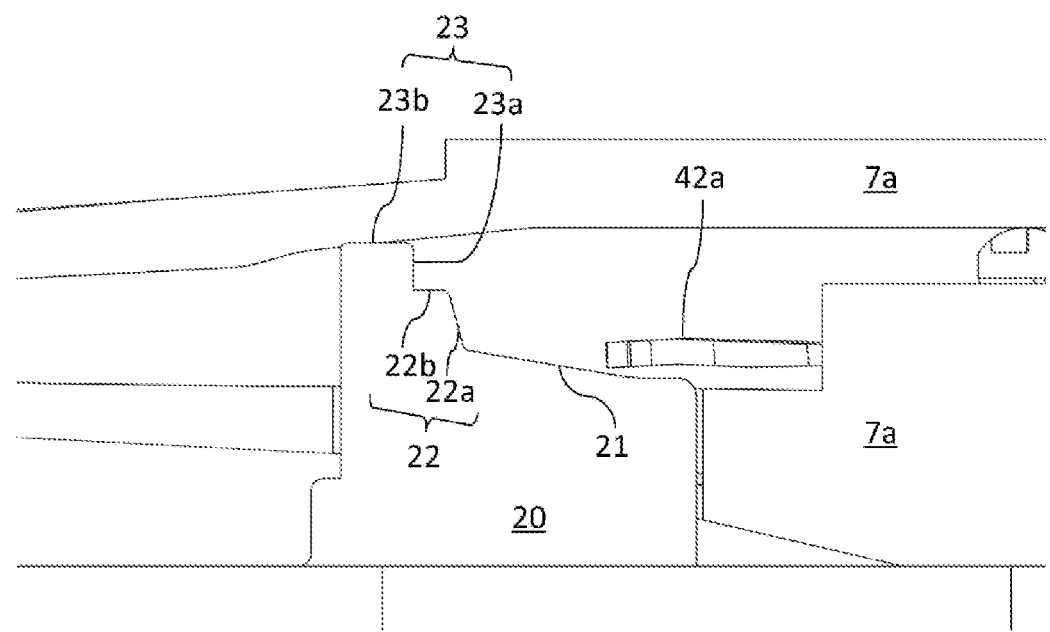
FIG. 6 is a side view showing a state of the protrusion and its vicinity in the intraocular lens injector according to the embodiment of the present invention, when viewed in a direction from Y1 toward Y2.

Note that FIGS. 1 and 2 of the present application are similar to FIGS. 1 and 6 of WO 2018/003854 in terms of configurations other than an intraocular lens 4. For this reason, among the reference signs shown in FIG. 2 of the present application, reference signs that are not described in the present specification are as described in WO 2018/003854.

The intraocular lens injector 1 is used when injecting an intraocular lens into an eye. In the present embodiment, as an example of the intraocular lens, there is provided a one-piece type intraocular lens 4 (see FIG. 2) made of a soft material such as silicone elastomer or soft acrylic, the intraocular lens 4 including an optical portion 41 with a circular effective optical portion 41a that performs an optical function and a peripheral portion 41b thereof, and two support portions 42a and 42b that extend outward in a curved manner from two positions on an outer circumferential portion of the optical portion 41. Reference sign 42a denotes a forward support portion that is disposed on a front side when the intraocular lens is set on a lens setting portion 11, and reference sign 42b denotes a rearward support portion that is disposed on a rear side.

A case in which the optical portion 41 of the intraocular lens 4 and base ends of the respective support portions 42a and 42b connected to the optical portion 41 are made of a soft material is given as an example. This configuration facilitates folding of the intraocular lens 4. Note that distal ends of the respective support portions 42a and 42b may be similarly made of a soft material, or may be made of a hard material (e.g., polyethylene, PMMA, etc.).

Note that the effective optical portion 41a of the optical portion 41 has a shape that realizes the optical function, the peripheral portion 41b is formed in a ring shape around the effective optical portion 41a, and the ring is in a flat plate form. It goes without saying that a configuration other than this may also be adopted. For example, a configuration may be adopted in which the optical portion 41 is composed only of the effective optical portion 41a. Also, a configuration may be adopted in which the peripheral portion 41b is formed to be continuous with the effective optical portion 41a, or in other words, the peripheral portion 41b and the effective optical portion 41a are smoothly connected to each other and form a continuous surface together.

The intraocular lens injector 1 includes an injector main body 5, sliders 6, an injection tube 7, a rotary member 8, a plunger 9, and a rod (disposed inside and hidden by the intraocular lens injector 1 in FIG. 1 and therefore not shown). Preferably, these constituent elements are each constituted by a resin molded product.

The injector main body 5 and the injection tube 7 have hollow structures and are connected to each other to thereby form a hollow body.

The sliders 6 are attached to the injector main body 5.

The injection tube 7 is disposed so as to be in communication with a leading end portion of the injector main body 5. The injection tube 7 and the leading end portion of the injector main body 5 may be integrally molded, or may be separately molded and combined by attaching the injection tube 7 to the leading end portion. The injection tube 7 has a hollow injection tube body 7a and a narrow tubular nozzle portion 7b. In this case, the lens setting portion 11 of the injector main body 5, together with the intraocular lens 4 set thereon, is housed and disposed in the injection tube body 7a of the injection tube 7. An injection hole 7c is formed in an upper surface of the injection tube body 7a. The injection hole 7c is a hole through which a viscoelastic substance (for example, sodium hyaluronate etc.) is injected. The viscoelastic substance injected from the injection hole 7c is supplied to the intraocular lens 4 that is set on the lens setting portion 11.

The rotary member 8 is rotatably connected to a rear end portion of the injector main body 5.

The plunger 9 is disposed coaxially with the injector main body 5. A portion of the plunger 9 is disposed inside the injector main body 5 via the rotary member 8, and the other portion of the plunger 9 is disposed protruding rearward from the rotary member 8.

The rod is disposed inside the hollow body formed by the injector main body 5 and the injection tube 7. The rod is connected to the plunger 9 and serves to advance the intraocular lens 4.

As shown in FIG. 2, the lens setting portion 11 includes a bottom surface portion 11a, lens receiving portions 11b, and lens guide portions 11c. The lens receiving portions 11b receive and support the intraocular lens 4 from below. The intraocular lens 4 is set on the lens setting portion 11 in a state in which the forward support portion 42a is disposed on the front side (the direction X1) as its name suggests, and the rearward support portion 42b is disposed on the rear side (the direction X2) as its name suggests. The intraocular lens injector 1 is of a preload type in which the intraocular lens 4 is set on the lens setting portion 11 of the injector main body 5 beforehand. Therefore, the intraocular lens 4 is one of the constituent elements of the intraocular lens injector 1. However, in carrying out the present invention, the intraocular lens injector 1 is not necessarily required to be of the preload type.

The configuration of the intraocular lens injector 1 excluding a protrusion 20, which will be described later, can be expressed as follows.

"An intraocular lens injector 1 including:
the hollow body which is an injector main body 5;
a lens setting portion 11 provided inside the hollow body;
an advancing member (a slider 6 or a rod connected to a plunger 9) for advancing the intraocular lens 4 disposed in the lens setting portion 11;
the protrusion 20 which is disposed forward of the lens setting portion 11 and protrudes from an inner wall of the hollow body; and
an injection tube 7 disposed at a front end portion of the hollow body,
the injection tube 7 having a hollow injection tube body 7a and a tubular nozzle portion 7b."

Configuration of Case

As the configuration of the case, for example, a configuration disclosed in Patent Document 1 to the applicant of the present invention may be adopted. With regard to the configuration of the case, the configuration disclosed in Patent Document 1 is adopted for the content that is not described below, and the description of Patent Document 1 is incorporated in the present specification in its entirety.

Note that, in case of any discrepancies between the content of WO 2018/003854 above and the content of Patent Document 1, the description in WO 2018/003854 takes precedence. For example, Patent Document 1 states that an intraocular lens 4 is set on a lens setting portion in a state in which a forward support portion is bent by a protrusion 80; however, in the present embodiment, as described in WO 2018/003854, a portion on which the intraocular lens 4 before being bent is placed is treated as the lens setting portion 11.

Figure 3:
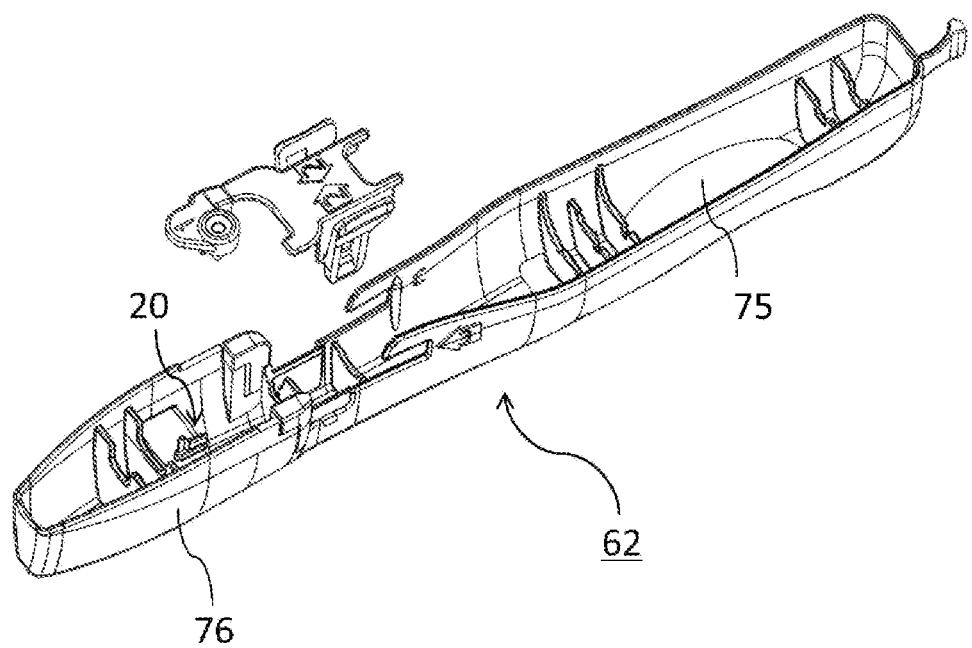
FIG. 3 is a perspective view of a case of the intraocular lens injector according to the embodiment of the present invention.
Figure 3:
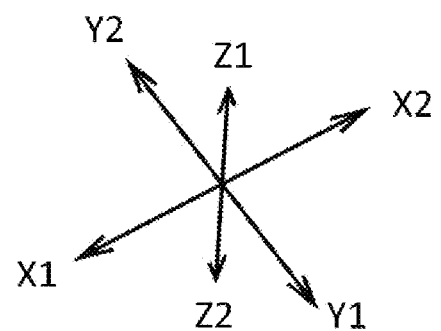

FIG. 3 is a perspective view of a case of the intraocular lens injector according to the embodiment of the present invention.

Figure 4:
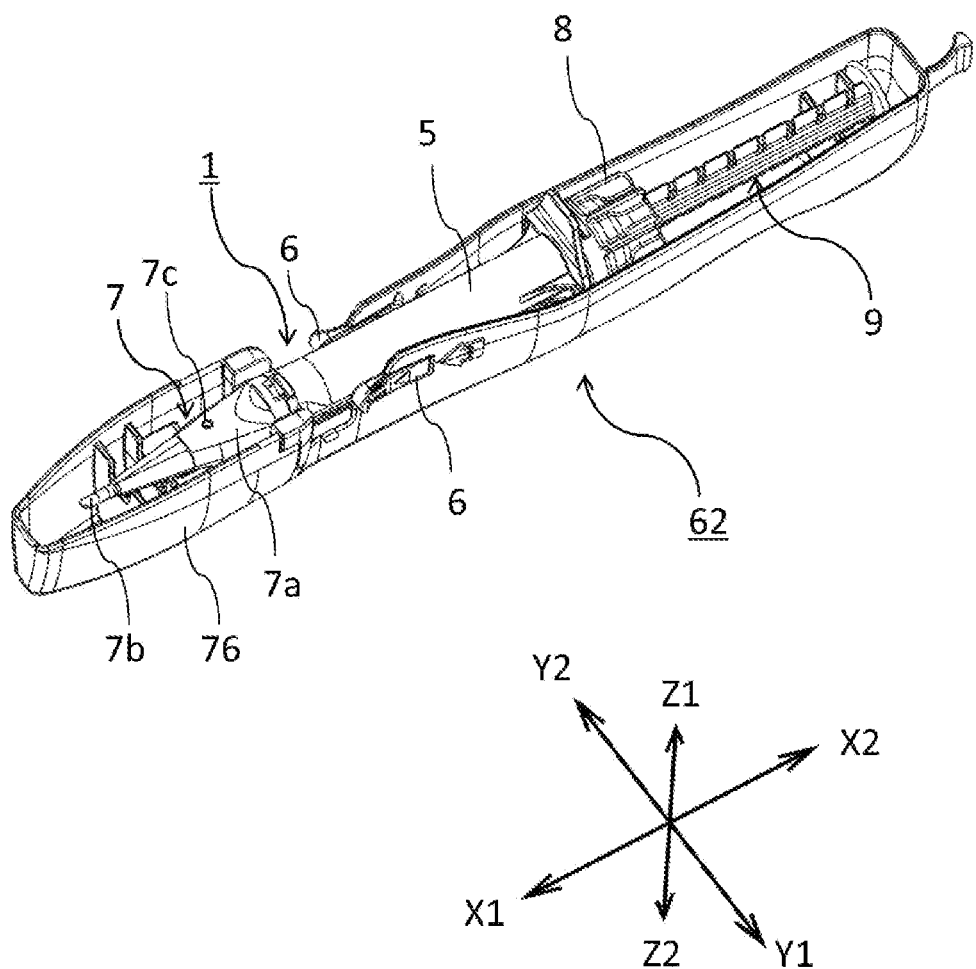
FIG. 4 is a perspective view showing a state in which the intraocular lens injector according to the embodiment of the present invention is attached to the case.

FIG. 4 is a perspective view showing a state in which the intraocular lens injector according to the embodiment of the present invention is attached to the case.

Figure 10:
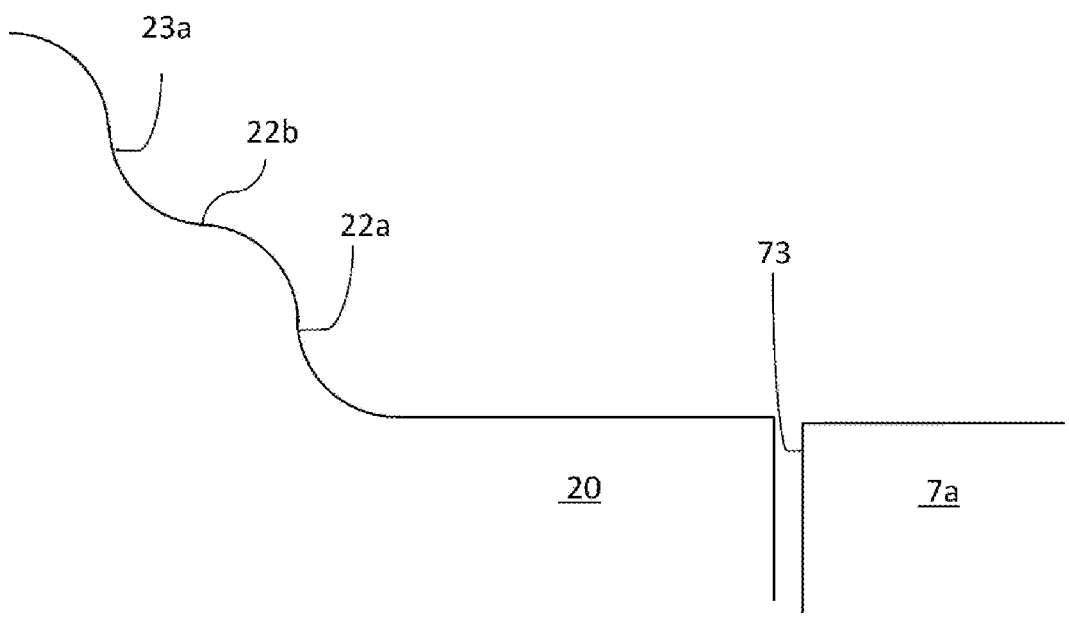
FIG. 10 is a schematic side view showing a state of a protrusion and its vicinity in an intraocular lens injector according to a variation (third variation) of the present invention, when viewed in the direction from Y1 toward Y2.

The intraocular lens injector 1 according to the present embodiment can be detachably fitted into a case 62 that is integrally molded from a synthetic resin material, for example. As shown in FIG. 10 of Patent Document 1 (corresponding to FIG. 3 of the present application), in the case 62, a U-shaped wall portion 76 extends perpendicularly from a bottom plate portion 75 so as to surround the intraocular lens injector 1, and the protrusion 20 extends perpendicularly from a predetermined position on the bottom plate portion 75.

As shown in FIG. 11 of Patent Document 1 (corresponding to FIG. 4 of the present application), the protrusion 20 is configured so as to be inserted into a protrusion insertion hole 73 of the intraocular lens injector 1 when the intraocular lens injector 1 is fitted into the case 62. Thus, in the intraocular lens injector 1, the protrusion 20 of the case 62 can be disposed in a central region of a space in which a leading end member 71 moves.

As shown in FIG. 4, in a state in which the intraocular lens injector 1 is fitted in the case 62, the intraocular lens 4 placed on the lens setting portion 11 is advanced toward a discharge hole of the nozzle portion 7b using the sliders 6. Note that, in the case where a configuration without the sliders 6 is adopted, the intraocular lens 4 may be advanced using the plunger 9 (directly by the rod connected to the plunger 9). For this reason, the sliders 6 or the rod connected to the plunger 9 is also referred to as an "advancing member".

As a result of the advancement of the intraocular lens 4, the forward support portion 42a of the intraocular lens 4 abuts against the protrusion 20, and a leading end of the forward support portion 42a is bent rearward (in the direction X2), that is, in the opposite direction to the lens advancing direction (forward, the direction X1), and is consequently bent into a substantially U shape.

Furthermore, the intraocular lens injector 1 is removed from the case 62 in this state, the intraocular lens 4 with the forward support portion 42a still being bent is then gradually pushed forward (in the direction X1) by the plunger 9, and the intraocular lens 4 can thus be released from the nozzle portion 7b.

Details of Protrusion According to the Present Embodiment

On the other hand, when releasing the intraocular lens 4, a problem arises in that, as described above, the leading end of the forward support portion 42a enters between an inner wall of the hollow body and an outer surface of the optical portion 41. To address this problem, in the present embodiment, the intraocular lens injector 1 with the protrusion 20 having the following form is used.

"An intraocular lens injector 1 for injecting an intraocular lens 4 into an eye, the intraocular lens 4 having an optical portion 41 and support portions 42a and 42b extending from the optical portion 41, the intraocular lens injector 1 including:
a hollow body having a lens setting portion 11 on which the intraocular lens 4 is set, with an optical axis direction of the intraocular lens 4 serving as a vertical direction; and
a protrusion 20 protruding from an inner wall of the hollow body, and having at least one step 22 (22a and 22b) directed upward when viewed from the lens setting portion 11 in a forward direction, and a wall 23a disposed forward of the step."

The form of the protrusion 20 of the present embodiment will be described in detail. The movement of the forward support portion 42a when the intraocular lens 4 is being advanced using the sliders 6 from a state in which the intraocular lens 4 is placed on the lens setting portion 11 will be described in chronological order.

Figure 5:
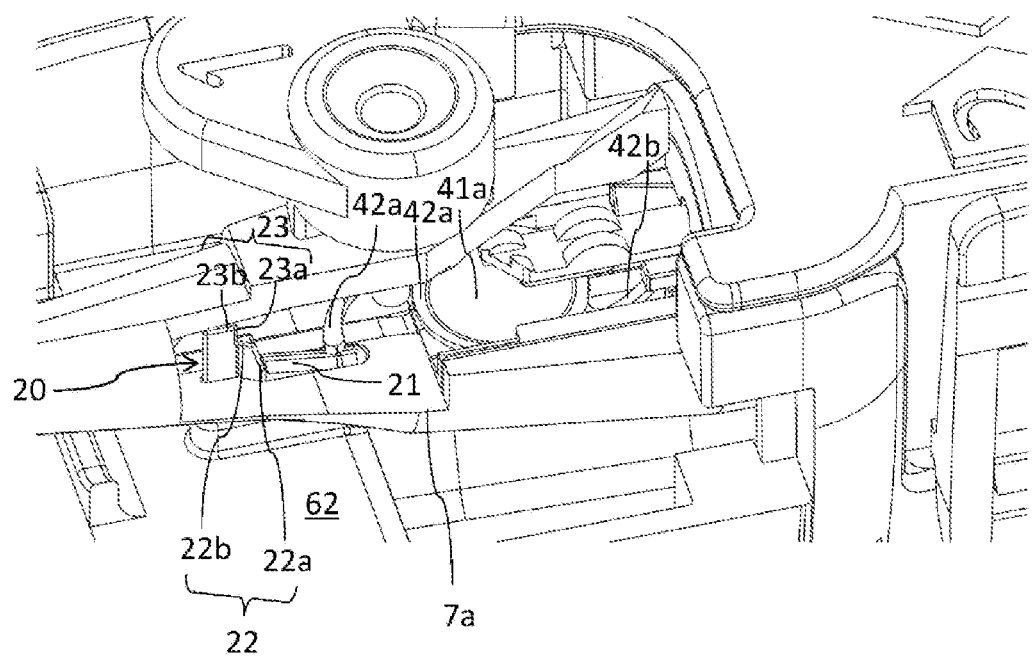
FIG. 5 is a perspective view showing a state of a protrusion and its vicinity in the intraocular lens injector according to the embodiment of the present invention.

FIG. 5 is a perspective view showing a state of the protrusion and its vicinity in the intraocular lens injector according to the embodiment of the present invention.

FIG. 6 is a side view showing a state of the protrusion and its vicinity in the intraocular lens injector according to the embodiment of the present invention, when viewed in a direction from Y1 toward Y2.

Figure 7:
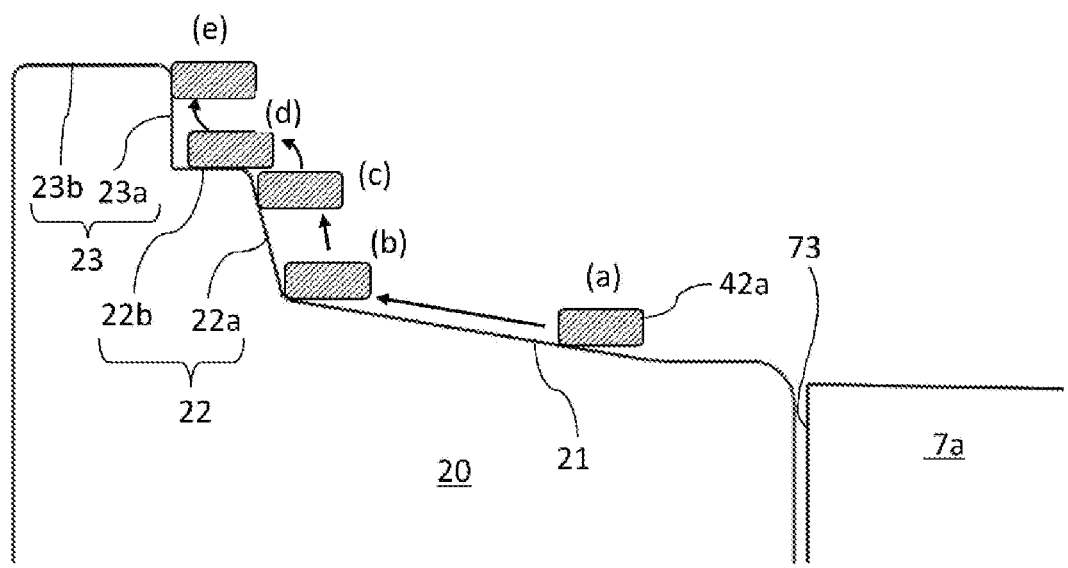
FIG. 7 is a schematic cross-sectional view showing movements of a forward support portion (when viewed in cross section) relative to the protrusion in the intraocular lens injector according to the embodiment of the present invention.

FIG. 7 is a schematic cross-sectional view showing movements of the forward support portion (when viewed in cross section) relative to the protrusion in the intraocular lens injector according to the embodiment of the present invention.

When the intraocular lens 4 starts advancing, the forward support portion 42a abuts against a rising portion 22a of a step 22 of the protrusion 20. As shown in FIG. 6, this step 22 is a single step directed upward, or in other words, a single step extending upward and forward. As the intraocular lens 4 continues to advance, the forward support portion 42a is bent rearward due to abutting against the step 22, and the forward support portion 42a slides up the step 22 due to the advancement of the optical portion 41 ((a)→(b)→(c) in FIG. 7).

As the intraocular lens 4 further continues to advance, the forward support portion 42a slides all the way up to the top 22b of the step 22. Once the forward support portion 42a has slid all the way to the top 22b of the step 22, the forward support portion 42a starts advancing again toward a wall portion 23a located forward of the step 22 while moving along the top of the step 22((c)→(d) in FIG. 7). During the above-described sequential movements of moving along the top 22b of the step 22 and advancing again, the bending of the forward support portion 42a is temporarily suppressed compared with that during the movement of sliding up the step 22.

Then, as the intraocular lens 4 further advances, the same phenomenon as that in the case of the first step 22 occurs, or more specifically, the forward support portion 42a slides up the wall 23a, and the degree of bending of the forward support portion 42a starts increasing again ((d)→(e) in FIG. 7).

In this manner, relative to the timing of advancement of the folded peripheral portion 41b of the optical portion 41 of the intraocular lens 4, the timing of movement of the leading end of the forward support portion 42a to the vicinity of the inner wall of the hollow body can be delayed. As a result, the accuracy of tacking can be improved.

Note that the protrusion 21 disclosed in Patent Document 1, which is the protrusion for bending the forward support portion, is a simple pin-like protrusion. Even if this pin-like protrusion can be regarded as a step, unlike the protrusion 20 of the present embodiment, a wall 23a does not exist forward of such a step. Furthermore, as for the other protrusions 52 and 80 disclosed in Patent Document 1, even though a concave curve is formed when they are viewed from the lens setting portion in the forward direction, there is only a single step when viewed from the lens setting portion in the forward direction, and unlike the protrusion 20 of the present embodiment, no wall 23a exists forward of the step.

There is no particular limitation on a specific form of the protrusion 20, as long as it satisfies the above-described configuration (i.e., protrudes from the inner wall of the hollow body and has the step and the wall). For example, the protrusion 20 may have at least two steps that protrude from bottom to top of the inner wall of the hollow body and are directed upward when viewed from the lens setting portion 11 in the forward direction.

As shown in FIGS. 5 and 6, when the protrusion 20 protrudes from bottom to top, there is no particular limitation on the number of steps directed upward as long as two or more steps are provided, but it is preferable that the number of steps is 2 to 4, because in this case the above-described timings can be effectively shifted, and the intraocular lens injector 1 can be easily produced. It goes without saying that, when even more steps are provided (or in other words, when the height of the rising portion 22a of each step 22 in the vertical direction decreases), it is still possible to delay the timing of movement of the leading end of the forward support portion 42a to the vicinity of the inner wall of the hollow body relative to the timing of advancement of the folded peripheral portion 41b of the optical portion 41 of the intraocular lens 4, compared with the protrusions disclosed in Patent Document 1.

The step 22 directed upward will be described in detail. For example, it is preferable that the rising portion 22a, which is the rearmost portion of the step, is disposed inclined at 45° to 95° with respect to the advancing direction of the intraocular lens 4, where the upper side is taken as the positive side and the lower side is taken as the negative side, and the inclination of a top portion 22b of the step 22 is set within a range of −30° to 30° with respect to the advancing direction of the intraocular lens 4. The reason for this is that, with this configuration, the above-described timings can be effectively shifted, and the accuracy of tacking is likely to be further improved. Similarly, it is preferable that the wall 23a (a rising portion of a second step 23), which is disposed forward of the step 22, is disposed inclined at 60° to 100° with respect to the advancing direction of the intraocular lens 4. Note that the inclination of a top portion 23b of the second step 23 is not particularly limited, but may be set within a range of −30° to 30° with respect to the advancing direction of the intraocular lens 4 as is the case with the top portion 22b of the first step 22. In the following description, the "step" refers to the first step 22 unless otherwise specified.

The height of the rising portion 22a, which is the rearmost portion of the step 22, in the vertical direction may be 0.3 to 1.5 mm, for example. The length of the top portion 22b of the step 22 in a front-rear direction may be 0.2 to 1.5 mm. The height of the wall 23a in the vertical direction may be 0.3 to 1.5 mm, for example. When a plurality of steps are provided, the heights of the rising portions of the individual steps in the vertical direction may be uniformly set to 0.3 to 1.5 mm. When these conditions are satisfied, the above-described timings can be effectively shifted, and the accuracy of tacking is likely to be improved.

Note that, in consideration of the use as the intraocular lens injector 1, it is preferable that the overall height of the protrusion 20 in the vertical direction is 1.5 to 3.0 mm.

As shown in FIGS. 5 to 7, a slope (inclined surface) 21 extending upward and forward may be disposed rearward of the step 22. With the slope 21 disposed, when the intraocular lens 4 starts advancing, the forward support portion 42a can be guided to the rising portion 22a of the step 22 against which the forward support portion 42a should abut. Note that the angle of the slope 21 is not particularly limited, but is preferably more than 0° and 45° or less with respect to the advancing direction of the intraocular lens in order for the slope 21 to be a slope.

Note that the slope 21 is preferably continuous with the bottom of the inner wall of the hollow body, but a certain difference (e.g., 0.1 mm or less in the vertical direction) in level at the boundary therebetween is acceptable. If the difference in level is greater than an acceptable value, the slope 21 can be regarded as a step 22. In consideration of such a situation, the expression "at least two steps" is used in this specification.

Figure 8:
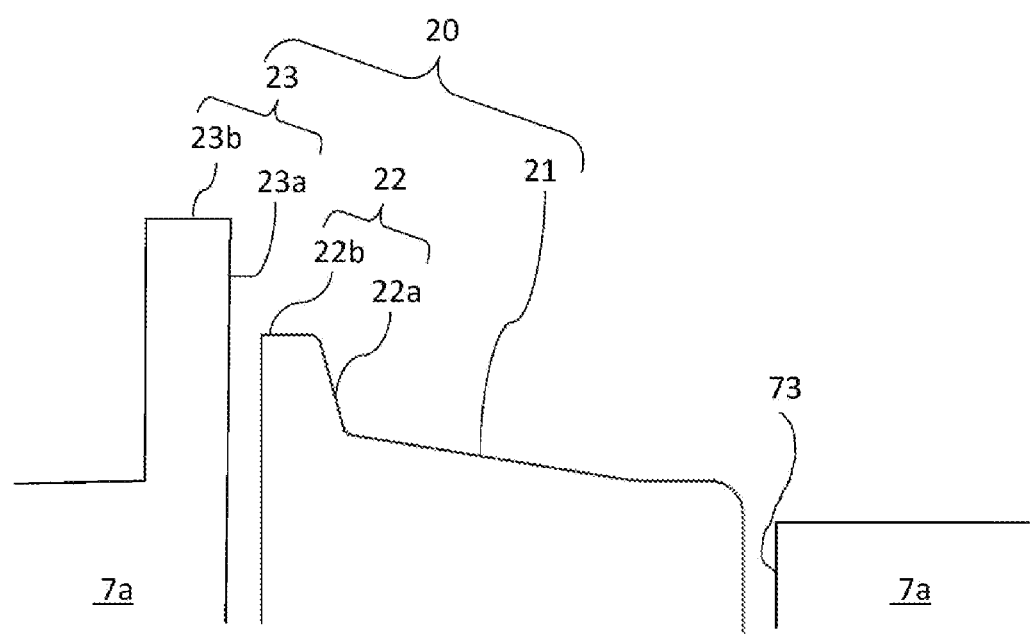
FIG. 8 is a schematic side view showing a state of a protrusion and its vicinity in an intraocular lens injector according to a variation (first variation) of the present invention, when viewed in the direction from Y1 toward Y2.

FIG. 8 is a schematic side view showing a state of a protrusion and its vicinity in an intraocular lens injector according to a variation (first variation) of the present invention, when viewed in the direction from Y1 toward Y2.

Note that, although a case in which the step 22 and the wall 23a are integrated has been described by way of example in the present embodiment, the step 22 and the wall 23a may be formed spaced apart from each other as shown in FIG. 8. However, if the separation distance between the step 22 and the wall 23a is excessively large, the forward support portion 42a may fall into the gap therebetween, and tacking may thus be affected. For this reason, if the step 22 and the wall 23a are spaced apart from each other, it is preferable that the separation distance is smaller than the minimum cross-sectional width of the forward support portion 42a.

With regard to the form of the protrusion 20 protruding from the inner wall of the hollow body, in the present embodiment, a case in which, as disclosed in Patent Document 1, the protrusion 20 is provided to the case 62 and the protrusion insertion hole 73 is formed in the intraocular lens injector 1 has been described by way of example.

That is to say, "an intraocular lens injector 1, further including a case 62 configured to be fitted to the hollow body, wherein the protrusion 20 is provided to the case 62 and a hole 73 is formed in the hollow body so that the protrusion 20 and the hole 73 can be fitted to each other" has been described by way of example in the present embodiment.

However, it goes without saying that the protrusion 20 or a portion thereof may be provided to the inner wall of the hollow body of the intraocular lens injector 1.

Furthermore, in the present embodiment, a case in which the protrusion 20 protrudes from the bottom to the top has been described by way of example. This case is preferred; however, the present invention is not limited to this case.

Figure 9:
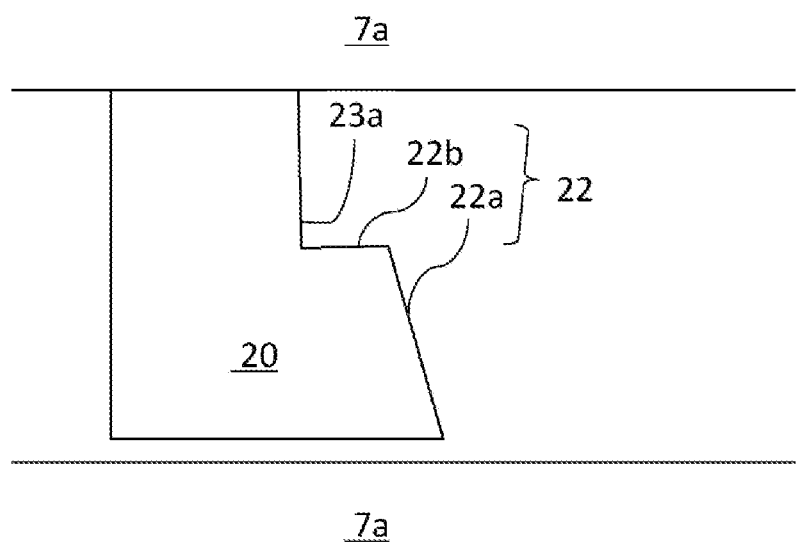
FIG. 9 is a schematic side view showing a state of a protrusion and its vicinity in an intraocular lens injector according to a variation (second variation) of the present invention, when viewed in the direction from Y1 toward Y2.

FIG. 9 is a schematic side view showing a state of a protrusion and its vicinity in an intraocular lens injector according to a variation (second variation) of the present invention, when viewed in the direction from Y1 toward Y2.

For example, as shown in FIG. 9, in the case where the protrusion 20 protrudes from the top toward the bottom of the inner wall of the hollow body, the protrusion 20 may be disposed such that it protrudes to a position above the bottom of the inner wall and the step 22 directed upward and the wall 23a hang from the top of the inner wall of the hollow body when viewed from the lens setting portion 11 in the forward direction. Similarly, a configuration is also possible in which the protrusion 20 protrudes from a lateral side of the inner wall of the hollow body.

As a result of examination by the inventor of the present invention, it was found that the accuracy of tacking can be further improved by chamfering a part between the rising portion 22a, which is the rearmost portion, and the top portion 22b of the step 22, or in other words, a corner portion of the step. There is no particular limitation on the form of the chamfering, and the corner may be cut off to form a flat surface portion as shown in FIGS. 5 and 6, or may be rounded.

Furthermore, the chamfering described in the previous paragraph may be performed on all the corner portions of the steps 22 and 23.

FIG. 10 is a schematic side view showing a state of a protrusion and its vicinity in an intraocular lens injector according to a variation (third variation) of the present invention, when viewed in the direction from Y1 toward Y2.

In the case of FIG. 10, when tangents to curved surfaces of a portion of the rising portion 22a and a portion of the wall 23a are inclined at 60° to 100°, for example, with respect to the advancing direction of the intraocular lens 4, the bending and sliding-up of the forward support portion 42a can be effectively achieved. Furthermore, when the gradient of a tangent to a portion corresponding to the top portion 22b of the step 22 is −30° to 30°, for example, with respect to the advancing direction of the intraocular lens 4, the forward support portion 42a moves up onto and along the portion 22b, and the bending thereof is thus temporarily suppressed.

Moreover, as a result of examination by the inventor of the present invention, it was also found that the extent of the risk that the forward support portion 42a will enter between the outer surface of the optical portion 41 and the inner wall of the intraocular lens injector 1 varies depending on the conditions (in particular, flexibility of the peripheral portion 41b of the intraocular lens 4) of the surgical procedure. A configuration that reflects the above-described findings is as follows.

"An intraocular lens injector further including the intraocular lens 4,
wherein the optical portion 41 and a base end of each support portion 42a, 42b in the intraocular lens 4 are made of a soft material, and
the optical portion 41 of the intraocular lens 4 has an effective optical portion 41a exhibiting an optical function, and a flat peripheral portion 41b disposed around the effective optical portion 41a."

The forms of the protrusion 20 according to the present embodiment that can be adopted have been specifically specified above. On the other hand, the technical idea of the present invention is to delay the timing of movement of the leading end of the forward support portion 42a to the vicinity of the inner wall of the intraocular lens injector 1, relative to the timing of advancement of the folded peripheral portion 41b of the optical portion 41 of the intraocular lens 4. The technical idea of the present invention can be expressed as a configuration below.

"An intraocular lens injector 1 for injecting an intraocular lens 4 into an eye, the intraocular lens 4 including an optical portion 41 having an optical function and support portions 42a and 42b extending from the optical portion 41, the intraocular lens injector 1 including:
a protrusion 20 for bending a forward support portion 42a while abutting against the forward support portion 42a, the forward support portion 42a being one of the support portions 42a and 42b and being disposed on the front side in an advancing direction of the intraocular lens 4, when making the intraocular lens 4 advance along an inner wall of a hollow body in which the intraocular lens 4 is set and thereby releasing the intraocular lens 4 from the hollow body in a state in which the intraocular lens 4 is folded with an inner surface of the optical portion 41 facing inward,
wherein the protrusion 20 has a retainer that temporarily suppresses progress of bending of the forward support portion 42a by retaining the forward support portion 42a, when the intraocular lens 4 is being folded."

Note that the foregoing preferred examples in which the forms of the protrusion 20 according to the present embodiment that can be adopted have been specifically specified can be applied to this configuration as well.

The protrusion 20 in the previous paragraph corresponds to the step 22 and the wall 23a that have been described above. Also, the retainer included in this protrusion 20 corresponds to the top portion 22b of the step 22 and the wall 23a that have been described above. That is to say, the forward support portion 42a temporarily fits between the top portion 22b of the step 22 and the wall 23a and is thereby temporarily retained. However, the retention is only temporary, and as the intraocular lens 4 further advances, the same phenomenon as that in the case of the first step 22 occurs, or more specifically, the forward support portion 42a slides up the wall 23a, and the degree of bending of the forward support portion 42a starts increasing again. Note that, when the present invention is expressed as described above, the protrusion 20 is not limited to the steps 22 and 23. Also, the retainer is not limited to the top portion 22b of the step 22 and the wall 23a located forward thereof.

More preferably, the technical idea of the present invention can be expressed as a configuration below.

"An intraocular lens injector 1, wherein the protrusion 20 has a first abutting portion for bending the forward support portion 42a while abutting against the forward support portion 42a when the intraocular lens 4 is being advanced by the advancing member, and the retainer disposed forward of the first abutting portion, and the retainer has a support receiving portion for supporting the forward support portion 42a after the forward support portion 42a is separated from the first abutting portion, and a second abutting portion which is disposed forward of the support receiving portion and abuts against the forward support portion 42a while the forward support portion 42a is supported by the support receiving portion."

The first abutting portion, the support receiving portion, and the second abutting portion correspond to the following constituent elements respectively.

The first abutting portion corresponds to the rising portion 22a of the step 22 in FIGS. 5 to 10.

The support receiving portion corresponds to the top portion 22b of the step 22 in FIGS. 5 to 10.

The second abutting portion corresponds to the wall 23a that is disposed forward of the step 22 in FIGS. 5 to 10.

Note that the expression "a retainer that temporarily suppresses progress of bending" is used to mean the following.

The protrusion disclosed in Patent Document 1 is simply a single step when viewed in the advancing direction of the intraocular lens. When the forward support portion 42a abuts against a rising portion of this step, bending thereof progresses continuously. The inventor of the present invention found that, if the forward support portion 42a slides all the way up to the top of the step, the progress of bending is suppressed the moment the forward support portion 42a finishes sliding up; however, by that time, the leading end of the forward support portion 42a may have reached the inner wall of the hollow body earlier than the peripheral portion 41b of the optical portion 40 of the intraocular lens 4. In that case, the forward support portion 42a enters between the outer surface of the optical portion 40 that is the opposite surface to the inner surface thereof and the inner wall of the intraocular lens injector.

By contrast, in the present embodiment, since the second abutting portion is present forward of the step, the forward support portion 42a advances and abuts against the second abutting portion while being supported by the support receiving portion, and then the degree of bending of the forward support portion 42a starts increasing again. The expression "a retainer that temporarily suppresses progress of bending" is used in the above-described configuration in order to describe that the degree of bending of the forward support portion 42a increases, decreases, and increases in this manner. This means that at least two discontinuous changes in the degree of bending will result with an intervening decrease therebetween.

As described above, the specific forms and the configurations that express the technical idea of the present invention all make it possible to delay the timing of movement of the leading end of the forward support portion 42a to the vicinity of the inner wall of the hollow body, relative to the timing of advancement of the peripheral portion 41b of the folded intraocular lens. As a result, the accuracy of tacking can be improved.

REFERENCE SIGNS LIST

1 Intraocular lens injector
5 Injector main body
6 Slider
7 Injection tube
7a Injection tube body
7b Nozzle portion
7c Injection hole
8 Rotary member
9 Plunger
11 Lens setting portion
11a Bottom surface portion
11b Lens receiving portion
11c Lens guide portion
73 Protrusion insertion hole
62 Case
20 Protrusion
21 Slope
22 (First) Step
22a Rising portion of (first) step
22b Top portion of (first) step
23 (Second) Step
23a Wall (of second step)
23b Top portion of (second) step
75 Bottom plate portion
76 U-shaped wall portion
4 Intraocular lens
41 Optical portion
41a Effective optical portion
41b Peripheral portion
42a Forward support portion
42b Rearward support portion

The invention claimed is:

1. An intraocular lens injector for injecting an intraocular lens into an eye, the intraocular lens including an optical portion having an optical function and support portions extending from the optical portion, the intraocular lens injector comprising:
   a hollow body including an inner wall and a lens setting portion and defining a lens advancing direction;
   a protrusion for bending a forward support portion while abutting against the forward support portion, the forward support portion being one of the support portions and being disposed forward of the intraocular lens in the lens advancing direction, when the intraocular lens advances along the inner wall of the hollow body in which the intraocular lens is set and thereby releasing the intraocular lens from the hollow body in a state in which the intraocular lens is folded with an inner surface of the optical portion facing inward,
   wherein the protrusion comprises
      an inclined surface that extends upwardly and in the lens advancing direction, defines a first slope, and is located at a rearmost side of the protrusion,
      a step that includes a rising portion, which extends upwardly and in the lens advancing direction and defines a second slope that is greater than the first slope, a flat top portion, and a chamfered part between the rising portion and the flat top portion, and
      an upwardly extending wall that is located forward of the flat top portion of the step.

2. The intraocular lens injector according to claim 1, wherein
   the hollow body comprises an injector main body;
   an advancing member for advancing the intraocular lens is disposed in the lens setting portion;
   the protrusion protrudes from the inner wall of the hollow body; and
   an injection tube, having a hollow injection tube body and a tubular nozzle portion, is disposed at a front end portion of the hollow body.

3. The intraocular lens injector according to claim 1, further comprising a case configured to be fitted to the hollow body,
wherein the protrusion is provided on the case and a hole is formed in the hollow body so that the protrusion and the hole can be fitted to each other.

4. The intraocular lens injector according to claim 1, further comprising the intraocular lens,
wherein the optical portion and a base end of each support portion in the intraocular lens are made of a soft material, and
the optical portion of the intraocular lens has an effective optical portion exhibiting an optical function, and a flat peripheral portion disposed around the effective optical portion.

5. The intraocular lens injector according to claim 1, wherein
the step is a first step;
the protrusion includes a second step;
the first and second steps each have only a single respective rising portion that extends upwardly and only a single respective flat top portion that extends in the lens advancing direction; and
the protrusion does not include additional steps.

6. The intraocular lens injector according to claim 1, wherein
the step is a first step;
the protrusion includes not more than three additional steps, each with a respective rising portion that extends upwardly and a respective top portion that extends in the lens advancing direction.

7. The intraocular lens injector according to claim 1, wherein
the step includes only a single rising portion and a single flat top portion.

8. An intraocular lens injector assembly for use with an intraocular lens having an optical portion and support portions extending from the optical portion, the intraocular lens injector assembly comprising:
an intraocular lens injector including a hollow body having a top surface with a hole for a viscoelastic substance, an inner wall, a lens setting portion within the hollow body on which the intraocular lens is set, with an optical axis direction of the intraocular lens serving as a vertical direction, a lens advancing direction, and a protrusion hole that extends through the inner wall and is located forward of the lens setting portion; and
a case, configured to partially surround the hollow body and to be secured to the hollow body, that includes a protrusion having
an inclined surface that extends upwardly and in the lens advancing direction, defines a first slope, and is located at a rearmost side of the protrusion, and
a step that includes a rising portion, which extends upwardly and in the lens advancing direction and defines a second slope that is greater than the first slope, a flat top portion, and a chamfered part between the rising portion and the flat top portion;
wherein the hollow body and the case are respectively configured such that the protrusion will extend through the protrusion hole when the case is secured to the hollow body and the intraocular lens injector is within the case; and
wherein an upwardly extending wall is disposed forward of the top portion of the step.

9. The intraocular lens injector according to claim 4, wherein the protrusion protrudes from bottom to top of the inner wall of the hollow body, the step is a first step, and the protrusion has a second step that is directed upward when viewed from the lens setting portion in the forward direction.

10. The intraocular lens injector assembly according to claim 8, wherein a slope is disposed at a rearmost side of the protrusion.

11. The intraocular lens injector assembly according to claim 8, further comprising the intraocular lens,
wherein the optical portion and a base end of each support portion in the intraocular lens are made of a soft material, and
the optical portion of the intraocular lens has an effective optical portion exhibiting an optical function, and a flat peripheral portion disposed around the effective optical portion.

12. The intraocular lens injector assembly according to claim 8, wherein the upwardly extending wall is part of the case.

13. The intraocular lens injector assembly according to claim 8, wherein the upwardly extending wall is part of the intraocular lens injector.

14. The intraocular lens injector assembly according to claim 8, wherein
the step is a first step;
the protrusion includes a second step;
the first and second steps each have only a single respective rising portion that extends upwardly and only a single respective flat top portion that extends in the lens advancing direction; and
the protrusion does not include additional steps.

15. The intraocular lens injector assembly according to claim 8, wherein
the step is a first step;
the protrusion includes not more than three additional steps, each with a respective rising portion that extends upwardly and a respective top portion that extends in the lens advancing direction.

16. The intraocular lens injector assembly according to claim 8, wherein
the step includes only a single rising portion and a single flat top portion.

* * * * *

UNITED STATES PATENT AND TRADEMARK OFFICE
CERTIFICATE OF CORRECTION

| | | |
|---|---|---|
| PATENT NO. | : 12,478,467 B2 | Page 1 of 1 |
| APPLICATION NO. | : 17/435762 | |
| DATED | : November 25, 2025 | |
| INVENTOR(S) | : Kazunori Kudo | |

It is certified that error appears in the above-identified patent and that said Letters Patent is hereby corrected as shown below:

On the Title Page

In Item (71), "Hoya Corporation, Tokyo (JP)" should be changed to --Hoya Medical Singapore Pte. Ltd., Singapore (SG)--.

Signed and Sealed this
Third Day of February, 2026

John A. Squires
*Director of the United States Patent and Trademark Office*